United States Patent [19]
Long, Jr. et al.

[11] Patent Number: 5,108,533
[45] Date of Patent: Apr. 28, 1992

[54] METHOD AND COMBINATION FOR INSTALLING A LINER WITHIN A SERVICE PIPE TRANSVERSELY CONNECTED TO A MAIN PIPE

[75] Inventors: Charles A. Long, Jr., Birmingham, Ala.; Frank A. Scudder; Richard P. Baxter, both of Jacksonville, Fla.

[73] Assignee: Long Technologies, Inc., Birmingham, Ala.

[21] Appl. No.: 419,068

[22] Filed: Oct. 10, 1989

[51] Int. Cl.$^5$ ............................................. B29C 63/34
[52] U.S. Cl. .................................... 156/294; 156/287; 156/423; 264/269; 264/573
[58] Field of Search ............... 156/287, 294, 423, 196, 156/213, 94; 138/97, 98; 264/269, 36

[56] References Cited

U.S. PATENT DOCUMENTS

| | | | |
|---|---|---|---|
| 2,971,259 | 2/1961 | Hahnau et al. | 33/1 |
| 3,230,129 | 1/1966 | Kelly | 156/287 |
| 3,607,361 | 9/1971 | Hight | 427/238 |
| 3,927,164 | 12/1975 | Shimabukuro | 156/287 |
| 4,009,063 | 2/1977 | Wood | 156/294 |
| 4,064,211 | 12/1977 | Wood | 156/287 |
| 4,135,958 | 1/1979 | Wood | 156/294 |
| 4,182,262 | 1/1980 | Everson et al. | 156/294 |
| 4,197,908 | 4/1980 | Davis et al. | 166/55 |
| 4,385,885 | 5/1983 | Wood | 156/294 |
| 4,434,115 | 2/1984 | Chick | 156/287 |
| 4,442,891 | 4/1984 | Wood | 166/55.2 |
| 4,446,181 | 5/1984 | Wood | 156/294 |
| 4,630,676 | 12/1986 | Long, Jr. | 166/55 |
| 4,668,125 | 5/1987 | Long, Jr. | 156/294 |
| 4,685,983 | 8/1987 | Long, Jr. | 156/294 |
| 4,776,370 | 10/1988 | Long, Jr. | 138/98 |
| 4,786,345 | 11/1988 | Wood | 156/287 |
| 4,877,665 | 10/1989 | Higuchi et al. | 156/294 |
| 4,956,041 | 9/1990 | Miyazaki et al. | 156/294 |

FOREIGN PATENT DOCUMENTS

| | | | |
|---|---|---|---|
| 1811140 | 7/1970 | Fed. Rep. of Germany | 138/97 |
| 0208014 | 12/1983 | Japan | 156/294 |
| 0107323 | 6/1985 | Japan | 156/212 |
| 0286325 | 11/1988 | Japan | 156/294 |
| 0192524 | 8/1989 | Japan | 156/294 |
| 0322834 | 7/1929 | United Kingdom | 156/294 |
| 2041147 | 9/1980 | United Kingdom | 264/269 |
| 2113608 | 8/1983 | United Kingdom | 156/294 |

*Primary Examiner*—Michael W. Ball
*Assistant Examiner*—Steven D. Maki
*Attorney, Agent, or Firm*—Panitch Schwarze Jacobs & Nadel

[57] ABSTRACT

An apparatus for installing a liner within a service pipe having an access end and a terminal end wherein the terminal end is transversely connected to a main pipe for allowing fluid to flow therebetween. The apparatus includes a flexible tubular member having a leading end and a trailing end. The leading end includes a flexible retainer secured thereto for being positioned within the main pipe proximate the service pipe terminal end. The flexible tubular member is impregnated with a thermosetting resin which cures after the flexible tubular member is positioned within the service pipe. Guiding and forcing members are provided for positioning the flexible tubular member within the service pipe such that the flexible retainer is seated within the main pipe proximate the service pipe terminal end and the trailing end is positioned proximate the service pipe access end. An inverted flexible tubular conduit is positioned within the flexible tubular member and filled with a fluid for forcing the flexible tubular member radially outwardly into engagement with the service pipe and for aiding the curing of the resin.

7 Claims, 8 Drawing Sheets

METHOD AND COMBINATION FOR INSTALLING A LINER WITHIN A SERVICE PIPE TRANSVERSELY CONNECTED TO A MAIN PIPE

FIELD OF THE INVENTION

The present invention relates generally to a method and apparatus for the installation of a liner within the interior of a conduit or pipe, such as a sewer pipe and, more particularly, a method and apparatus for installing a liner within a service pipe which is transversely connected to a main pipe.

BACKGROUND OF THE INVENTION

It is generally well known that conduits or pipes, particularly underground pipes, which are employed for conducting fluids, for example, sanitary sewer pipes, storm sewer pipes, water lines and gas lines, frequently require repair due to fluid leakage. The leakage may be inwardly, from the environment into the interior or conducting part of the pipe, or outwardly, from the conducting part of the pipe into the surrounding environment. Leakage of this type may be due to improper initial installation of the pipe, deterioration of the pipe itself due to normal aging or the effects of conveying corrosive or abrasive materials, cracking of the pipe or pipe joints due to environmental conditions, such as earthquakes, the movement of large vehicles or similar natural or man-made vibrations, or any other such causes. Regardless of the cause, such leakage is undesirable, at best, and may result in waste of the fluid being conveyed by the pipe, damage to the surrounding environment and the possible creation of dangerous public health hazards.

Because of ever increasing labor and machinery costs, it is becoming increasingly more difficult, at least economically, to dig up and replace underground pipes or portions or sections of such underground pipes which may be leaking. As a result, various methods have been devised for the in situ repair or rehabilitation of existing pipes, thereby avoiding the expenses and hazards associated with digging up and replacing the pipes or pipe sections.

Briefly, in the conventional processes for the in situ repair or rehabilitation of existing pipes, an elongated flexible tubular liner comprised of a felt fabric or foam or similar flexible material, which has been impregnated with a thermosetting synthetic catalyzed resin is installed within the existing pipe utilizing an inverting or everting process, as is known to those skilled in the art. Once the flexible liner is installed in place within the pipe, the liner is pressurized from within, preferably utilizing a fluid such as water, to force the liner radially outwardly to engage and conform to the interior surface of the pipe and to force some of the impregnated resin into any cracks or interstices within the walls of the pipe. The resin is then cured to form a relatively hard, tight fitting, rigid pipe lining which effectively seals any cracks and repairs any pipe or pipe joint deterioration to prevent further leakage either into or out of the pipe. The cured resin liner also serves to strengthen the existing pipe walls to provide added structural support for the surrounding overburden.

The conventional processes for the installation of a liner within the interior of a pipe are problematic in that they are limited to a pipe having a leading end and a trailing end, wherein the leading and trailing ends are directly or easily accessible. That is, the conventional processes have been limited to installing liners within, for example, main sewer pipes which typically are installed underground beneath a street or road in a residential or commercial area and are easily accessible through existing manholes. One device for installing a liner in such a main sewer pipe is disclosed in U.S. Pat. No. 4,685,983, issued to Charles A. Long, Jr. and assigned to Long Technologies, Inc., which is hereby incorporated by reference.

Typically, the main sewer pipe is in fluid communication with each house or building in the residential or commercial area for receiving sewage therefrom and transporting the sewage to a treatment center. A service pipe is transversely connected to the main pipe, for instance, at a wye connection, and provides the means for transporting the sewage to the main pipe, as is understood by those skilled in the art. After a liner has been installed within the main pipe as described above, a conventional robot cutter apparatus such as the apparatus disclosed in U.S. Pat. No. 4,630,676, issued to Charles A. Long, Jr. and assigned to Long Technologies, Inc., is deployed within the main pipe for cutting a portion of the liner in the area where the service pipe meets the main pipe for allowing fluid within the service pipe to flow into the lined main pipe.

While much effort and expense has been expended to reconstruct main sewers, interceptor sewers and trunk sewers, there now exists a need for an effective and economical method for reconstructing service pipes which extend between commercial or residential buildings and the main sewer pipe. The present invention is directed to a service pipe which has been located near the building or private property line and wherein the service pipe includes a clean-out fitting proximate the property line, as is understood by those skilled in the art. While it is preferred that the main sewer first be reconstructed with a new liner and cut away at each of the service connections, the present invention of installing a liner within the service pipe is not limited thereto.

The present invention overcomes many of the difficulties inherent in the prior art liner installation method by providing a flexible tubular liner which can be installed from just one end of a service pipe. That is, the liner of the present invention can be installed within a service pipe without having to directly access both ends of the pipe. The present invention includes a flexible tubular liner having a flexible retainer secured thereto which is positioned through the clean-out fitting of the service pipe, through the service pipe and into the main pipe proximate the service pipe terminal end for preventing the flexible tubular liner from moving into the service pipe. Consequently, the present invention provides considerable savings economically by avoiding the necessity of having to dig up or replace underground service pipes which may be leaking or damaged.

SUMMARY OF THE INVENTION

Briefly stated, one aspect of the present invention comprises an apparatus for installing a liner within a service pipe having a first inner diameter, an access end and a terminal end wherein the terminal end is transversely connected to a main pipe for allowing fluid to flow therebetween. The main pipe has a second inner diameter. The apparatus includes a flexible tubular member having a leading end and a trailing end. The leading end includes a flexible retainer secured thereto for being positioned within the main pipe proximate the service pipe terminal end. The flexible tubular member is impregnated with a thermosetting resin which cures after the flexible tubular member is positioned within the service pipe. Installing means are provided for positioning the flexible tubular member within the service pipe such that the flexible retainer is seated within the main pipe proximate the service pipe terminal end and the trailing end is positioned proximate the service pipe access end. Additionally, curing means are positioned within the flexible tubular member for forcing the flexible tubular member radially outward into engagement with the service pipe and for aiding the curing of the resin whereby the service pipe is lined with the flexible tubular member.

BRIEF DESCRIPTION OF THE DRAWINGS

The foregoing summary, as well as the following detailed description is better understood when read in conjunction with the appended drawings. For the purpose of illustrating the present invention, there is shown in the drawings several embodiments which are presently preferred, it being understood, however, that this invention is not limited to the precise arrangements and instrumentalities shown. In the drawings.

DESCRIPTION OF PREFERRED EMBODIMENTS

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the apparatus for installing a liner within a service pipe and designated parts thereof. The terminology includes the words above specifically mentioned, derivatives thereof and words of similar import.

Figure 1:
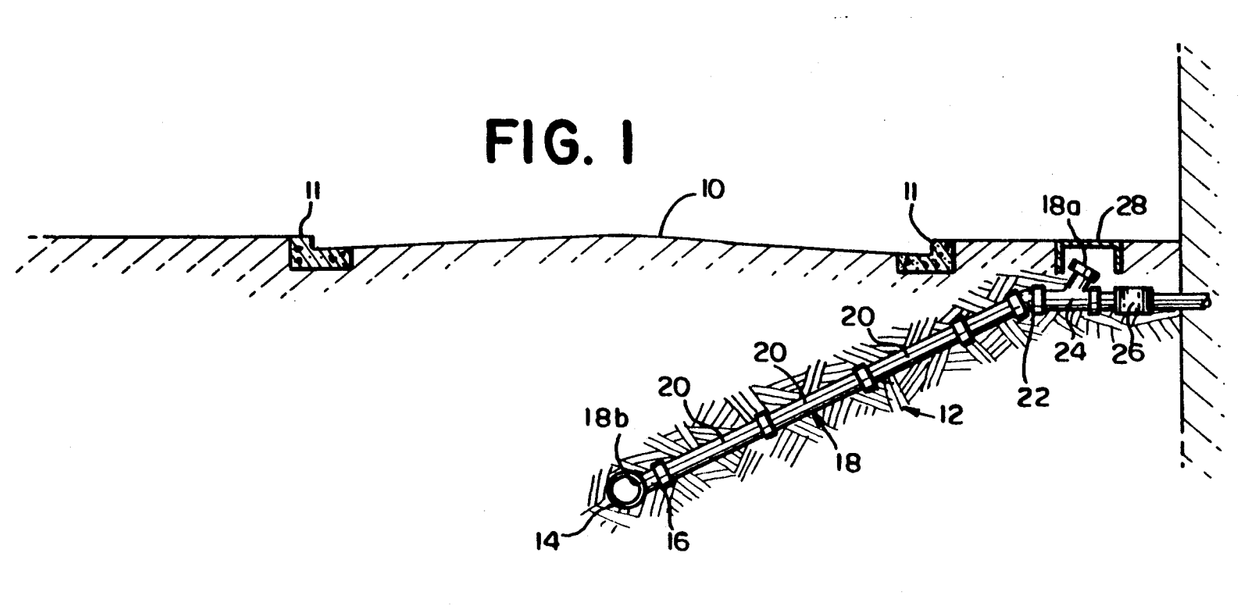
FIG. 1 is a partial cross-sectional view of a typical street, illustrating a main sewer pipe and a service pipe transversely connected thereto for installation of a liner in accordance with the present invention.
Figures 2, 3:
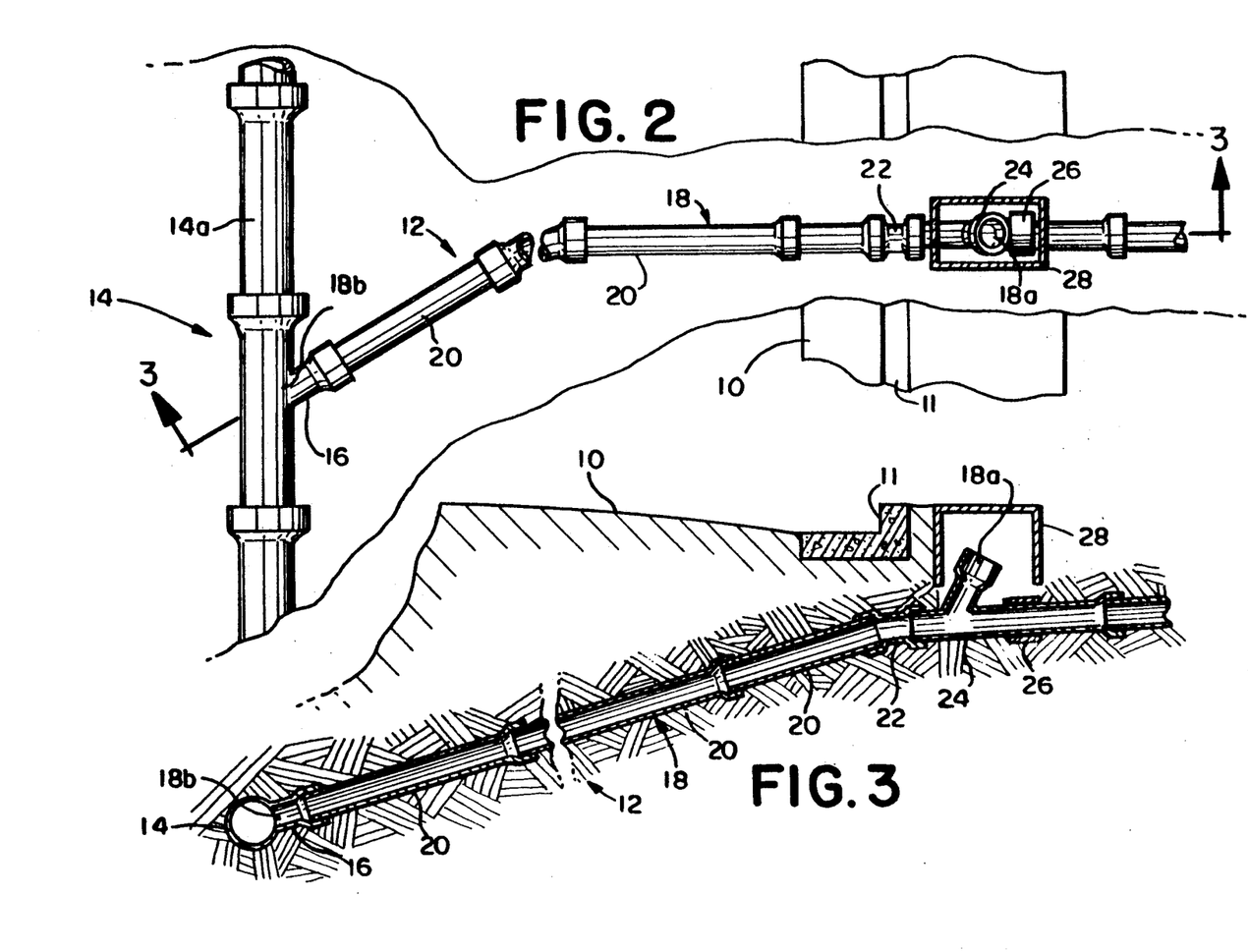
FIG. 2 is a top plan view of the typical street of FIG. 1, partially in cross-section and broken away, showing the main sewer pipe and service pipe of FIG. 1.
FIG. 3 is a cross-sectional view of the main sewer pipe and service pipe of FIG. 2 taken along line 3—3 of FIG. 2.

Referring to the drawings, wherein like numerals are employed for the indication of like elements throughout, there is shown in FIGS. 1 through 3 a typical or standard street 10 including a roadside curb 11. There is further shown a sewer construction, generally designated 12, to which the present invention is directed.

Referring now to FIG. 2, there is shown a main sewer pipe or main pipe 14 positioned beneath or under the street 10 and extending generally parallel thereto. The main sewer pipe 14 is comprised of a series of interconnected bell joint pipe sections or pipes 14a, as is understood by those skilled in the art. The main sewer pipe 14 further includes a service wye connection 16 for receiving sewage from a house or building (not shown) situated proximate the street 10 or main sewer pipe 14.

As shown in FIGS. 1 and 3, a service pipe 18 having a first inner diameter is connected to the wye 16 and extends upwardly to the service pipe bend 22. The service pipe 18 is comprised of a series of bell joint pipe sections 20 interconnected between the service pipe bend 22 and the wye 16. Preferably, a clean-out fitting 24 has previously been installed or is installed between the service pipe bend 22 and a coupling 26, as is understood by those skilled in the art. A clean-out housing 28 is provided above and around the clean-out fitting 24 for the protection thereof.

Referring now to FIG. 3, the service pipe 18 has an access end 18a and a terminal end 18b for allowing fluid to flow therethrough. The access end 18a is located proximate the clean-out fitting 24 to facilitate access to the interior of the service pipe 18. The terminal end 18b is transversely connected to the main pipe 14, via the wye 16, for allowing fluid to flow between the service and main pipes 18, 14. The main pipe 14 has a second inner diameter which is preferably greater than the first inner diameter of the service pipe 18. However, it is understood by those skilled in the art that the main pipe 14 and service pipe 18 could be of any relative suitable diameters.

The main pipe 14 and service pipe 18 are constructed in a manner that is well known to those skilled in the art and, therefore, further description thereof is not necessary. Moreover, the present invention is not limited to any specific type of sewer, pipe or conduit and therefore further description of the above sewer system is neither necessary nor limiting.

Figure 4:
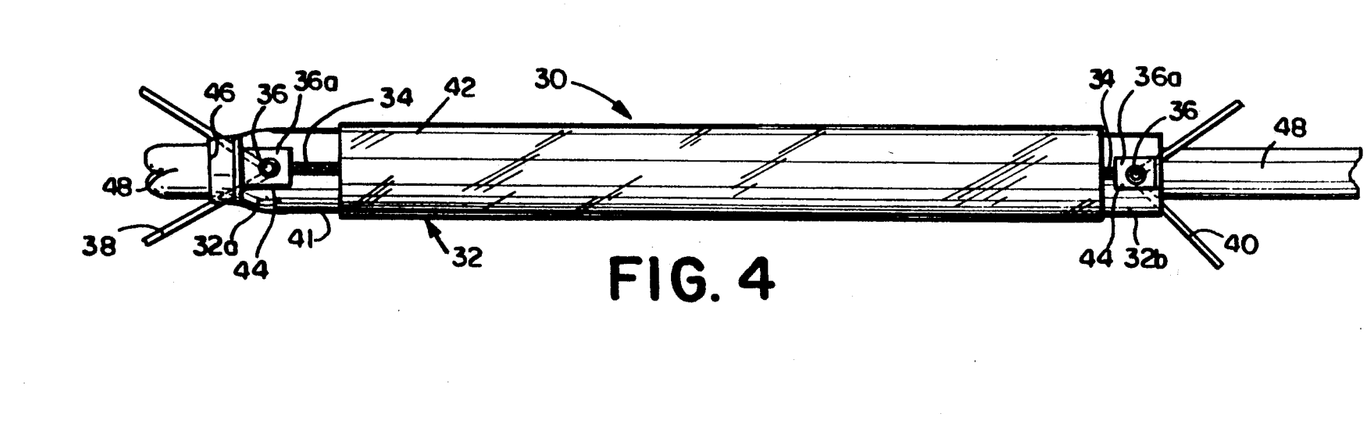
FIG. 4 is a top plan view of a flattened service tube assembly in accordance with a first preferred embodiment of the invention.

Referring now to FIG. 4, there is shown a first service tube assembly 30 in accordance with a first preferred embodiment of the invention. The first service tube assembly 30 includes a flexible tubular member or liner assembly 32 having a leading end 32a and a trailing end 32b for being positioned within the service pipe 18. In the first preferred embodiment, the flexible tubular member assembly 32 is preferably comprised of a flexible tube 41 positioned within a generally transparent sleeve 42, as described in more detail hereinafter. While in the preferred embodiment, the flexible tubular member assembly 32 is preferably comprised of two telescoped flexible tubular members, it is understood by those skilled in the art that the flexible tubular member assembly 32 could also be constructed of a single flexible tubular member. For example, the flexible tubular member assembly 32 could be comprised of a single flexible tubular member constructed of a felt fabric having a polymeric coating.

In the present embodiment, it is preferred that the flexible tube 41 be constructed of a felt fabric. However, it is understood by those skilled in the art that the flexible tube 41 can be constructed of other materials, such as cloth fabric or similar flexible material, without departing from the spirit and scope of the invention.

Preferably, the flexible tube 41 is made by cutting an appropriate length and width of felt fabric which generally corresponds to or complements the size (diameter and length) of the service pipe 18. The longitudinal edges of the felt are then joined and sewed together with a butt stitch 34 to form the flexible tube 41. Preferably, the outer diameter of the flexible tube 41 is generally equal to the inner diameter of the service pipe 18.

As shown in FIG. 4, a generally transparent sleeve 42, preferably constructed of a polymeric material, is positioned over the flexible tube 41 to thereby form the flexible tubular member assembly 32. The polymeric sleeve 42 preferably has a wall thickness of approximately one millimeter, but may be of other thicknesses, such as 3 millimeters, without departing from the spirit and scope of the invention.

Preferably, the polymeric sleeve 42 has a length of approximately one foot shorter than the total length of the flexible tube 41. Specifically, the polymeric sleeve 42 is positioned over the flexible tube 41 to leave approximately six inches of the flexible tube 41 uncovered or exposed at each end. The flexible tube 41 extends beyond the ends of the polymeric sleeve 42 to permit a complete seal and/or bond of the flexible tubular member assembly 32 to the service pipe 18 at the terminal end 18b and access end 18a in a manner which will hereinafter become apparent. The polymeric sleeve 42 protects the felt tube 41 during handling and insertion into the service pipe 18, as described in more detail hereinafter.

In the present embodiment, it is preferred that installing means be provided for positioning the flexible tubular member assembly 32 within the service pipe 18 such that a flexible retainer 46 (described in more detail hereinafter) is seated within the main pipe 14 proximate the service pipe terminal end 18b and the trailing end 32b is positioned proximate the service pipe access end 18a. It is preferred that the installing means include a pair of generally annularly shaped metal grommets 36, each being respectively positioned on the flexible tube 41 at or near the leading end 32a and the trailing end 32b, as shown in FIG. 4.

Preferably, a pull forward rope or cable 38 is threaded through the metal grommet 36 located on the leading end 32a. Similarly, a pull back rope or cable 40 is preferably threaded through the metal grommet 36 on the trailing end 32b. The pull forward rope 38 and pull back rope 40 are used to position the flexible tubular member assembly 32 and/or first service tube assembly 30 within the service pipe 18, as described in more detail hereinafter.

In the present embodiment, it is preferred that the metal grommets 36 be secured to a reinforced region of the flexible tube 41. More particularly, it is preferred that a reinforcing flap 36a, preferably constructed of felt or some other material, be flame bonded or otherwise secured to the flexible tube 41 at and around the point where the metal grommets 36 are located. It is understood by those skilled in the art that the reinforcing flap 36a can be secured to the flexible tube 41 by other means, such as epoxy or stitching. By including a reinforced region in the flexible tube 41, the metal grommets 36 cannot readily pull or tear through the felt fabric and render the first service tube assembly 30 unusable.

Figure 6:
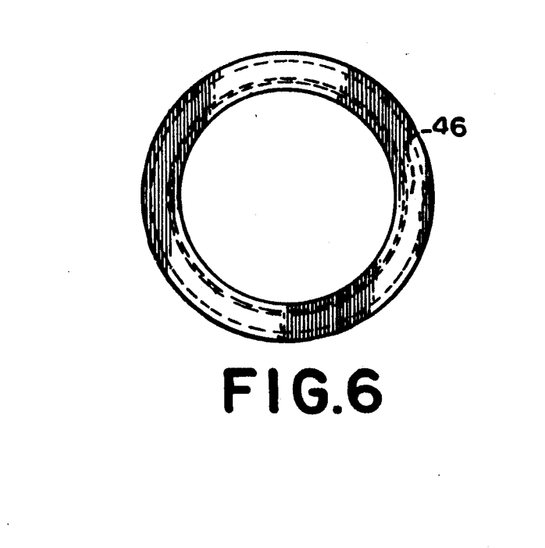
FIG. 6 is a front elevational view of a flexible tube and flexible retainer in accordance with the present invention.
Figure 7:
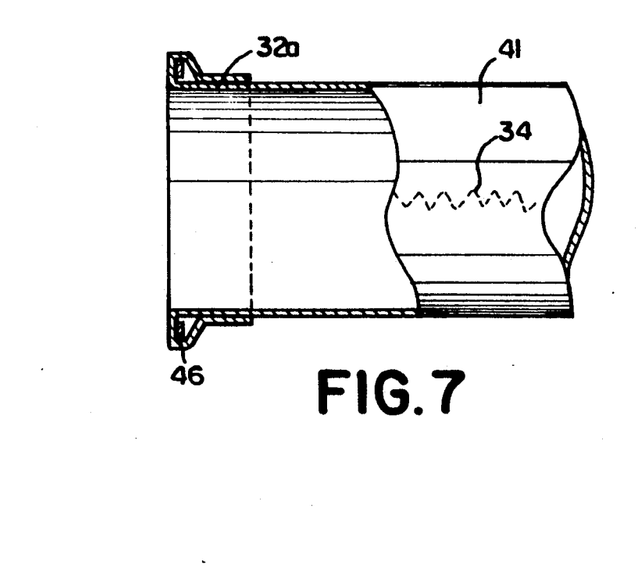
FIG. 7 is a side elevational view, in partial cross-section, of the flexible tube and flexible retainer in accordance with the present invention.
Figure 9:
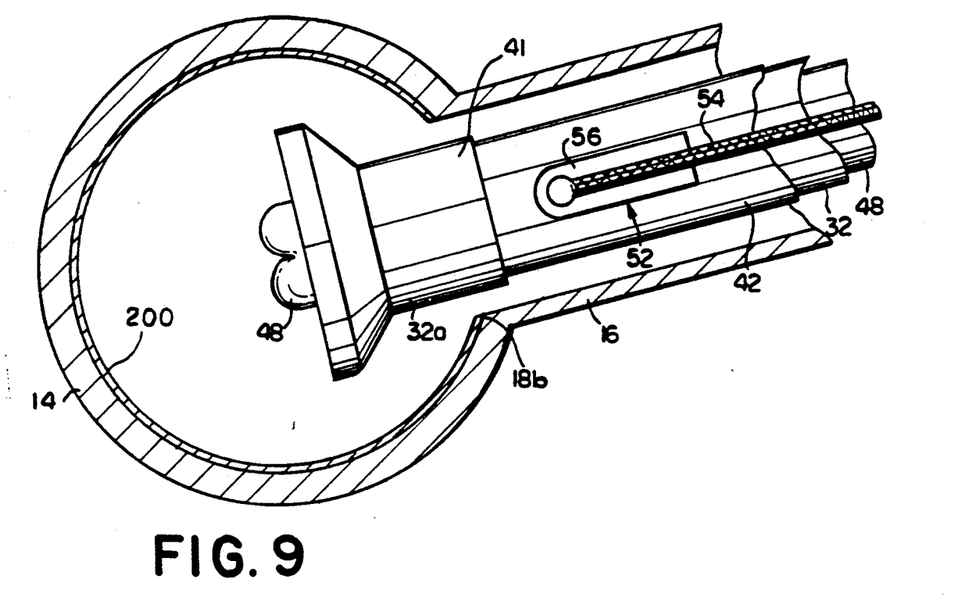
FIG. 9 is a greatly enlarged side elevational view in partial cross-section of the main sewer pipe and service pipe connection showing the leading end of the service tube assembly therein prior to the curing process in accordance with the second preferred embodiment of the present invention.
Figure 10:
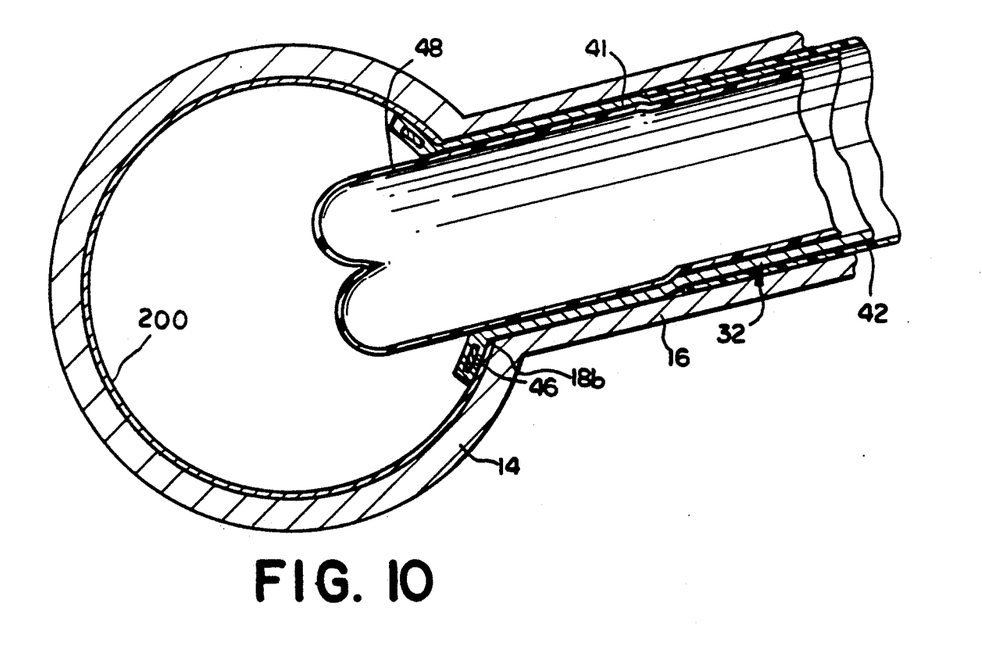
FIG. 10 is a greatly enlarged cross-sectional view of the service tube assembly showing the service tube assembly within the service pipe during the curing process in accordance with the present invention.

Referring now to FIGS. 4, 6 and 7, the leading end 32a of the flexible tubular member assembly 32 includes a flexible retainer 46 secured thereto for being positioned within the main pipe 14 proximate the service pipe terminal end 18b for preventing the leading end 32a from moving into the service pipe 18, as described in more detail with respect to FIGS. 9 and 10. As shown in FIG. 6, in the present embodiment, it is preferred that the flexible retainer 46 be generally annular in shape and have an inner diameter which is approximately one inch greater than the inner diameter of the service pipe 18 for securing the flexible tubular member leading end 32a within the main pipe 14 proximate the service pipe 18. However, it is understood by those skilled in the art that the flexible retainer 46 could be of any annular-like configuration, such as elliptical, oval or square. For example, if the terminal end 18b is a wye connection 16, it is preferred that the flexible retainer 46 have a generally elliptical/annular-like configuration (not shown).

As shown in FIG. 7, the flexible retainer 46 is preferably positioned within a rolled-over portion of the flexible tube 41. In the present embodiment, it is preferred that the overlapped portion of the tube 41 be sewn together to capture and hold the retainer 46. However, it is understood by those skilled in the art that other methods and instrumentalities can be used for securing the flexible retainer 46 to the felt tube 41 at the flexible tubular member assembly leading end 32a, such as flame bonding or using an adhesive such as a polymeric resin for coupling the overlapped tubular member portions.

In the present embodiment, it is preferred that the flexible retainer 46 be positioned radially outwardly of the outer surface of the flexible tube 41, with the flexible tube 41 being rolled over the flexible retainer 46 to engage the outer surface or diameter of the flexible tubular member assembly 32, as shown in FIG. 7. However, it is understood by those skilled in the art that the leading end 32a of the flexible tubular member assembly 32 could alternatively have a diameter greater than the outer diameter of the flexible retainer 46 (and greater than the remainder of the flexible tube 41) to position the flexible tube 41 over and outwardly of the flexible retainer 46 and then through the flexible retainer 46 into engagement with the interior surface of the flexible tube 41 (not shown).

In the present embodiment, it is preferred that the flexible retainer 46 be constructed of a flexible material which allows it to be temporarily compressed or compacted radially inwardly into position within the service pipe 18 and yet also allows it to expand beyond the inner diameter of the service pipe 18 when the flexible retainer 46 is positioned within the main pipe 14, as shown in FIG. 10. The radial and axial thicknesses of the flexible retainer 46 are selected to provide the flexible retainer 46 with sufficient structural integrity to maintain the retainer within the main pipe 14, without unduly restricting the flow of fluid through the main and service pipes 14, 18.

Preferably, in the case of a typical service pipe with an inner diameter of six inches, the flexible retainer 46 is constructed of a high density polymeric material having a radial thickness of approximately $\frac{1}{2}''$ and an axial thickness of approximately 3/16" for providing the flexible retainer 46 with structural integrity. However, it is understood by those skilled in the art that the flexible retainer 46 can be constructed of a relatively hard, closed cell rubber or of other similar materials having similar properties, such as foam or polyurethane. It is also understood by those skilled in the art that the flexible retainer 46 can be constructed of other radial and axial thicknesses to conform to the requirements of the different sized service pipes or conduits.

The outer diameter of the flexible retainer 46 is larger than the outer diameter of the flexible tube 41, as shown in FIG. 7. The flexible tube 41 appears to have a diameter which is larger than the outer diameter of the flexible retainer 46 in FIGS. 4 and 5, only because the flexible tube 41 is shown in a flattened state as if it were laid out on a flat surface.

Referring now to FIG. 4, as mentioned previously, the flexible tubular member assembly 32 includes installing means. That is, a guide member or pull forward rope 38 is releasably secured to the leading end 32a of the flexible tubular member assembly 32 for guiding and forcing the leading end 32a of the flexible tubular member assembly 32 through the access end 18a into the service pipe 18, through the terminal end 18b into the main pipe 14 such that the flexible retainer 46 is positioned within the main pipe 14 proximate the terminal end 18b, as is shown in FIGS. 9 and 10. Similarly, the trailing end 32b of the flexible tubular member assembly 32 includes installing means which is comprised of a pull member or pull back rope 40 releasably secured thereto for pulling the trailing end 32b toward the service pipe access end 18a. Thus, the flexible tubular member assembly 32 can be pulled taut within the service pipe 18 such that the flexible retainer 46 seats within the main pipe 14 proximate the service pipe terminal end 18b, as discussed in more detail hereinafter.

In the present preferred embodiment, the flexible tubular member assembly 32 is preferably impregnated with a thermosetting resin which cures after the flexible tubular member assembly 32 is positioned within the service pipe 18. More specifically, it is preferred that the flexible tube 41 be impregnated with the thermosetting resin. It is preferred that the resin be a thermosetting epoxy resin of a type known to those skilled in the art. However, the thermosetting epoxy resin may contain a quick setting polyester resin or a quick setting vinylester resin, as is understood by those skilled in the art. It is also understood that the type of resin employed is not pertinent to the present invention as various resin and catalyst systems can be used based on varying environments, pipes, liner materials, etc., which are all understood by those skilled in the art.

As shown in FIG. 4, the service tube assembly 30 preferably includes curing means positioned within the flexible tubular member assembly 32 for forcing the flexible tubular member assembly 32 radially outwardly into engagement with the service pipe 18 and for aiding the curing of the resin. In the present embodiment, it is preferred that the curing means be comprised of an inverted flexible tubular conduit 48 positioned within the flexible tubular member assembly 32 for being filled with a fluid under pressure for forcing the flexible tubular member assembly 32 radially outwardly towards and into engagement with the interior walls of the service pipe 18 and for facilitating the curing of the resin. In the present embodiment, it is preferred that the fluid be selected from a group consisting of water, air and both water and air. Specifically, pressurized air is used for forcing the flexible tubular member assembly 32 outwardly towards the service pipe 18, while heated water is used for facilitating the curing of the resin, as described in more detail hereinafter.

Figure 5:
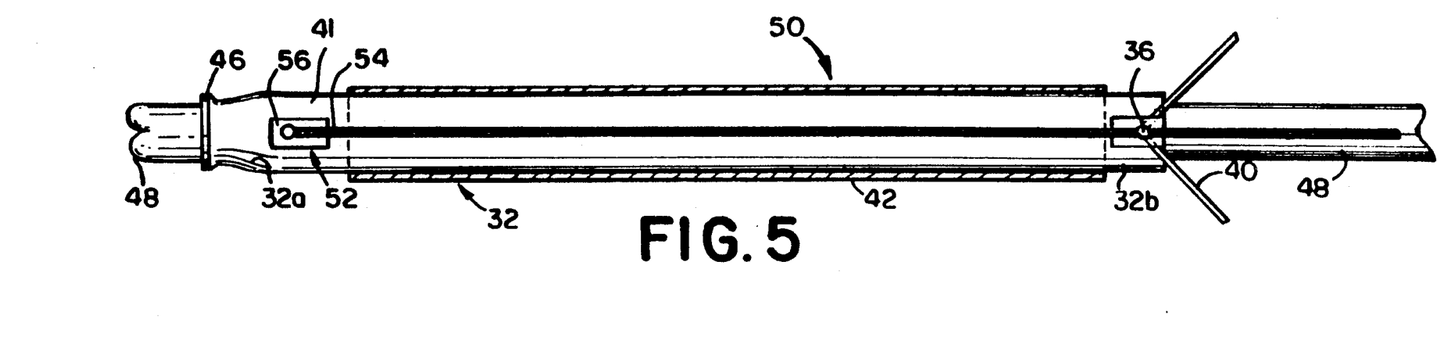
FIG. 5 is a top plan view in partial cross section of a flattened service tube assembly in accordance with a second preferred embodiment of the invention.

Referring now to FIG. 5, there is shown a second service tube assembly 50 in accordance with a second preferred embodiment of the invention. The second service tube assembly 50 is preferably generally identical to the first service tube assembly 30. The main difference is that the leading end 32a of the flexible tubular member assembly 32 includes a push pocket 52 for receiving therein a guide member or flexible sewer push rod 54, known to those skilled in the art, to provide means for installing the flexible tubular member assembly 32 within the service pipe 18. The push pocket 52 is preferably constructed by flame bonding three sides of a strip or flap of felt material 56 to the tube 41 proximate the leading end 32a. However, it is understood by those skilled in the art that the strip of felt 56 can be secured proximate the leading end 32a by other means, such as using epoxy or by stitching.

The sewer push rod 54 is preferably used to guide or force the leading end 32a of the flexible tubular member assembly 32 through the access end 18a into the service pipe 18 and through the terminal end 18b into the main pipe 14, such that the flexible retainer 46 is positioned within the main pipe 14 proximate the terminal end 18b, as is shown in FIGS. 9 and 10. As mentioned previously, the trailing end 32b of the flexible tubular member assembly 32 includes a pull member or pull back rope 40 releasably secured thereto through the metal grommet 36 for pulling the flexible tubular member assembly 32 taut within the service pipe 18 such that the flexible retainer 46 seats within the main pipe 14 proximate the terminal end 18b after the sewer push rod 54 is removed, as discussed in more detail hereinafter.

Figure 8:
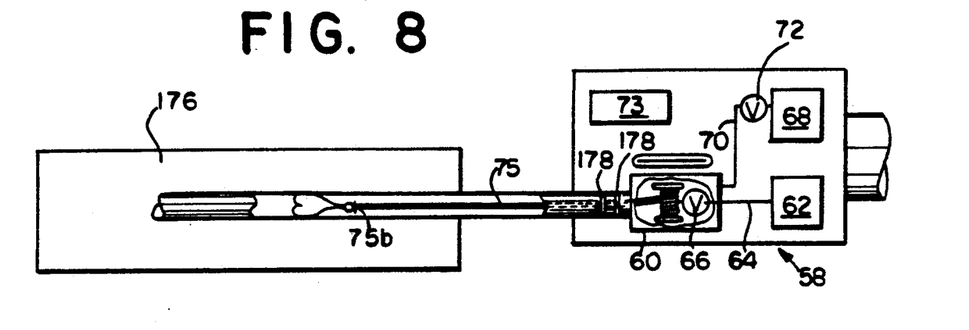
FIG. 8 is a schematic view of an apparatus for installing a flexible tubular liner within a service pipe in accordance with the present invention.

Referring now to FIG. 8, there is schematically shown an apparatus for assisting in the installation of the flexible tubular member assembly 32 within the service pipe 18. The apparatus preferably comprises a small truck 58 used for impregnating the flexible tube 41 of the flexible tubular member assembly 32 with resin and for forcing the flexible tubular member assembly 32 radially outwardly into engagement with the service pipe 18 and for aiding the curing of the resin to thereby line the service pipe 18 with the flexible tubular member assembly 32.

Specifically, the truck 58 preferably includes a small pressure vessel assembly 60 preferably connected to a compressed air source 62 by means of a standard conduit, such as a pipe or flexible hose 64, and air valve means 66. Generally, the pressure vessel assembly 60 is preferably a smaller version of the pressure vessel assembly disclosed in U.S. Pat. No. 4,685,983, and is used for inverting the flexible tubular conduit 48 using air pressure, as described in more detail hereinafter. A hot water source 68, preferably a hot water heater, is connected to the pressure vessel assembly 60 via a standard conduit, such as a pipe or flexible hose 70 and water valve means 72. The various conduits and controls interconnected between the small pressure vessel assembly 60 and the compressed air and hot water sources 62, 68 in the preferred embodiment is described in more detail hereinafter.

The truck 58 further includes a wet-out apparatus 73 which contains squeeze rollers and other equipment (not shown) to saturate the flexible tube 41 of the flexible tubular member assembly 32 with quick-setting epoxy resin, as is understood by those skilled in the art.

Figure 12:
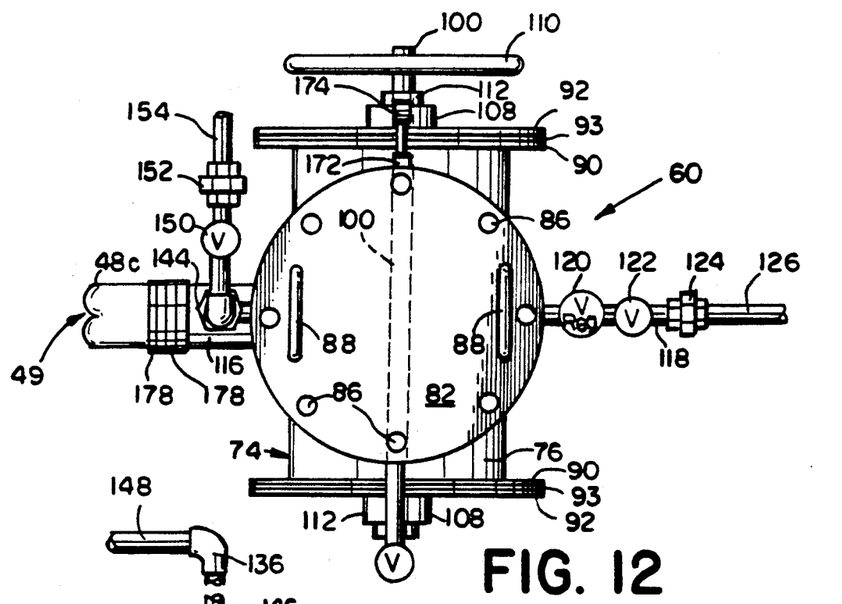
FIG. 12 is a top plan view of a portable apparatus for inverting a flexible tubular conduit in accordance with an alternate embodiment of the present invention.
Figure 13:
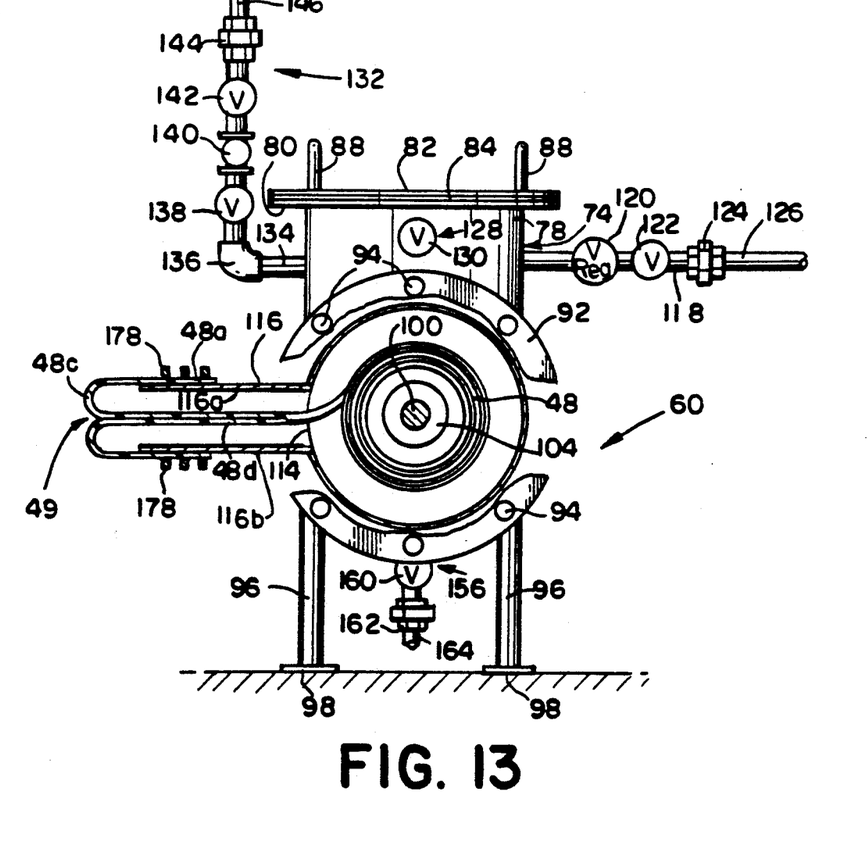
FIG. 13 is a front elevational view, in partial cross-section, of the portable apparatus shown in FIG. 12.
Figure 14:
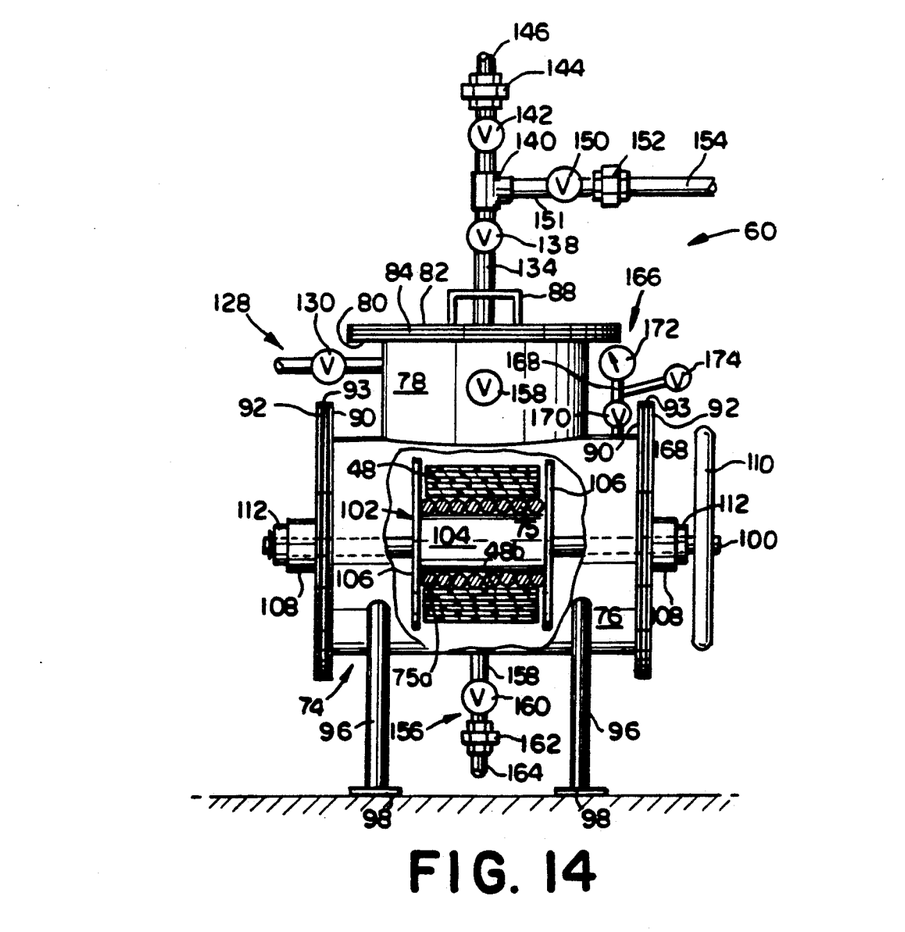
FIG. 14 is a side elevational view, in partial cross-section and partially broken away, of the portable apparatus shown in FIG. 12.

Referring now to FIGS. 12-14, there is shown an apparatus for inverting the flexible tubular conduit 48. In the preferred embodiment, the apparatus is the small pressure vessel assembly 60 positioned within the truck 58.

The flexible tubular conduit 48 includes a leading end 48a and a trailing end 48b. As shown in FIG. 8, in the present embodiment, it is preferred that a hold back rope or cable 75 be provided having one end 75b connected to the trailing end 48b of the flexible tubular conduit 48, as described in more detail hereinafter. Preferably, the flexible tubular conduit 48 is constructed of a material which is impervious to fluids, such as a synthetic or rubber material. As shown in FIG. 13, the flexible tubular conduit 48 includes an inner surface 48c and an outer surface 48d.

Referring now to FIGS. 12-14, there is shown a generally enclosed chamber 74 for storing the flexible tubular conduit 48 therein in a noninverted state. In the present embodiment, it is preferred that the chamber 74 include a generally horizontal pipe or pipe section 76 having an aperture therein for sealingly receiving a vertical pipe or pipe section 78 thereby forming a generally t-shaped chamber 74, as best shown in FIG. 14.

For ease of description, it is understood that the generally enclosed chamber 74 and its related parts are preferably constructed of a high strength metallic material, such as steel, except as otherwise indicated. It is further understood, that the related parts of the enclosed chamber 74 are preferably interconnected by welding, unless otherwise indicated. However, it is understood by those skilled in the art, that the enclosed chamber 74 can be constructed of other materials having similar properties and strengths, such as cast iron or other metallic alloys and that the related parts can be interconnected in other manners, without departing from the spirit and scope of the invention.

The vertical section 78 preferably includes a radially extending flange 80 for sealingly receiving a cover plate 82. The cover plate 82 and flange 80 include corresponding or complementary holes 86 for receiving bolts therethrough (not shown). The cover plate 82 is positioned over the flange 80 with a gasket 84 therebetween for preventing fluid from escaping therebetween. A plurality of bolts (not shown) are positioned through the holes 86 and receive cooperating nuts (not shown) for removably securing the cover plate 82 and flange 80 together, as is understood by those skilled in the art.

The cover plate 82 further includes lifting handles 88 to facilitate removing the cover plate 82 from the vertical section 78 when necessary. In the present embodiment, it is preferred that the lifting handles 88 be welded to the cover plate 82. However, it is understood by those skilled in the art that the lifting handles can be secured to the cover plate 82 by other instrumentalities and methods. For instance, the lifting handles 88 could be cast directly into the cover plate 82.

As shown in FIGS. 13 and 14, the horizontal section 76 preferably includes radially extending flanges 90 at each end thereof for receiving horizontal cover plates 92. A single horizontal cover plate 92 is preferably secured to each radially extending flange 90 via suitable nuts and bolts (not shown) extending through complementary holes 94 in the flange 90 and horizontal cover plate 92. A gasket 93 is provided between the flanges 90 and horizontal cover plates 92 for preventing fluid from escaping therebetween.

The generally enclosed chamber 74 is supported by four legs 96 extending downwardly from the horizontal section 76. Secured to the bottom of each leg 96 is a horizontal plate 98 for providing the legs 96 with a stable base.

As shown in FIGS. 12 and 14, the horizontal cover plates 92 include an opening therein for rotatably receiving a shaft 100 therethrough. The shaft 100 is preferably long enough to extend between the two cover plates 92 and has a generally circular cross-section for allowing the shaft 100 to rotate with respect to the cover plates 92. Shaft support collars or bushings 112 are provided on each end of the shaft 100 for positioning the shaft 100 within the horizontal section 76. The shaft support collars 112 are known to those skilled in the art and further description thereof is not necessary nor is it limiting.

As shown in FIGS. 13 and 14, reel means are positioned within the chamber 74 to which one end 75a of the hold back rope 75 is connected and upon which the hold back rope 75 and flexible tubular conduit 48 are wound, as described in more detail hereinafter. In the present embodiment, the reel means comprises a control drum assembly 102 which includes a center core 104 fixedly connected to the shaft 100 for rotation therewith. A pair of side plates 106 extend generally parallel to the horizontal cover plates 92 and are fixedly secured to the ends of the center core 104. The side plates 106 include a hole therein for receiving the shaft 100 therethrough.

In the present embodiment, it is preferred that the center core 104 be welded to the shaft 100. However, it is understood by those skilled in the art that other instrumentalities could be used to secure the center core 104 to the shaft 100, such as longitudinally cooperating splines.

In order to prevent fluid from leaking or escaping between the shaft 100 and the horizontal cover plates 92, it is preferred that packing glands 108 be provided around the shaft 100 adjacent to the horizontal cover plates 92. However, it is understood by those skilled in the art, that other means could be used for preventing fluid from passing between the horizontal cover plates 92 and the shaft 100.

Referring now to FIGS. 12 and 14, reel control means is provided for controlling the rate at which the hold back rope 75 and flexible tubular conduit 48 are wound and unwound from the reel means or control drum assembly 102 to thereby control the feed rate of the flexible tubular conduit 48, as discussed in more detail hereinafter. In the present embodiment, it is preferred that the reel control means comprise a manually activated control wheel 110 rotatably secured to the shaft 100, for rotating the shaft 100 and the control drum assembly 102. Preferably, the control wheel 110 is secured to the shaft 100 by means of a key way and key (not shown). However, it is understood by those skilled in the art, that other means can be used for securing the control wheel 110 to the shaft 100, such as longitudinal splines.

It is also understood by those skilled in the art that other means could be provided for rotating the shaft 100 and control drum assembly 102. For instance, an electrical motor (not shown) having suitable gearing and/or controls could be provided for automatically rotating the control drum assembly 102 to control the feed rate of the flexible tubular conduit 48 in response to a variety of parameters, such as pressure within the chamber 74, water temperature, etc.

Referring now to FIGS. 12 and 13, the chamber 74 includes exit means for feeding the flexible tubular conduit 48 therethrough and for inverting the conduit 48. The leading end 48a of the flexible tubular conduit 48 extends through the exit means, and is inverted and secured thereto. More particularly, the exit means comprises an exit port 114 having a generally continuous annular member or inversion pipe 116 extending outwardly from the chamber 74. Preferably, the annular member 116 is sized to complement the exit port 114. In the present embodiment, the annular member 116 has an inner surface 116a and an outer surface 116b.

The leading end 48a of the flexible tubular conduit 48 extends through the exit port 114 and annular member inner surface 116a and is inverted such that the flexible tubular conduit outer surface 48d is in sealing engagement with the annular member outer surface 116b, as described in more detail hereinafter.

As shown in FIGS. 12 and 13, pressure means is provided for generating fluid pressure within the chamber 74 for forcing the flexible tubular conduit 48 through the exit port 114 and annular member 116. Preferably, the pressure means is a source of pressurized fluid in fluid communication with the chamber 74 for pressurizing the chamber 74 to an amount greater than atmospheric pressure. For instance, in the present embodiment, it is preferred that the source of pressurized fluid be the compressed air source 62 shown in FIG. 8.

The compressed air source 62 is in fluid communication with the chamber 74 via a conduit 118 extending between the air pressure source 62 and the vertical section or pipe 78. The conduit 118 includes an air regulator valve 120, air inlet valve 122 and a union 124 which receives a flexible hose 126 from the compressed air source 62. As shown in FIG. 14, pressure is relieved from the chamber 74 by an air relief assembly 128 which consists of an air relief valve 130 in fluid communication with the chamber 74.

As shown in FIGS. 13 and 14, the chamber 74 is also in fluid communication with means for filling the inverted flexible tubular conduit 48 and chamber 74 with a liquid. In the present embodiment, it is preferred that the liquid be heated water. The means for filling the chamber 74 and inverted flexible tubular conduit 48 comprises a water inlet assembly 132 which consists of a water conduit 134, pipe elbows 136, water control valve 138, pipe tee 140, snorkel control valve 142, union 144, snorkel pipe 146, flexible hose 148, water inlet valve 150, union 152, and flexible hose 154.

A water outlet assembly 156 is provided beneath the chamber 74 and includes a water outlet conduit 158, water outlet valve 160, union 162 and flexible hose 164. As shown in FIG. 14, a pressure indicator assembly 166 is provided and comprises a pressure indicator conduit 168, air valve 170, pressure gauge 172 and an air output valve 174.

The pressure vessel assembly 60 of the present invention is preferably portable in the sense that if desired, it can be removed from the truck 58 and placed proximate a clean-out fitting 24. Preferably, the air pressure source 62 and hot water source 68 remain within the truck 58 and are in communication with the chamber 74 via the flexible hoses, described above.

The method for controlling the flow of fluid into and out of the chamber 74 is described in more detail hereinafter. However, the various pressure regulators, valves, conduits and etc. used in the present invention are standard, off the shelf items. Consequently, knowledge of their use and operation is well within the ambit of the ordinarily skilled artisan and, therefore, further description thereof is neither necessary nor limiting.

The method for installing the flexible tubular member assembly 32 within the service pipe 18 is as follows. Referring now to FIGS. 1-3, preferably, the main sewer pipe 14 has been previously lined from manhole to manhole with a liner 200 (see FIGS. 9 and 10), as described in U.S. Pat. No. 4,685,983. Similarly, all service connections have preferably been cut out to most of the full diameter of the service pipe 18, as is understood by those skilled in the art. It is also understood that the service pipe 18 must first be prepared. That is, if not already in place, a clean-out fitting 24 and a clean-out housing 28 are installed and the service pipe 18 is cleaned and all roots or other protrusions are removed utilizing traditional cleaning methods in a manner well known in the art, or by employing a cleaning apparatus as disclosed in U.S. Pat. No. 4,487,699 which is issued to Charles A. Long, Jr. and assigned to Long Technologies, Inc.

Referring now to FIGS. 4 and 5 and as mentioned previously, a flexible tubular member assembly 32 is provided having a leading end 32a and a trailing end 32b. The leading end 32a includes a flexible retainer 46 secured thereto for being positioned within the main pipe 14 proximate the service pipe terminal end 18b. The flexible tubular member assembly 32 is prepared for installation within the service pipe 18 by assembling the first service tube assembly 30 as described above.

Referring now to FIG. 8, to assemble the first service tube assembly 30, the length of the service pipe 18 between the clean-out fitting 24 and the main sewer pipe 14 is determined using known measurement techniques and a suitable length of the flexible tube 41 is cut and prepared as described above. The flexible tube 41 is preferably laid out on a working surface or temporary mat 176. The polymeric sleeve 42 is inserted over the flexible tube 41 and the flexible tube 41 is saturated or impregnated with quick setting or thermosetting epoxy resin using the wet-out apparatus 73, as is understood by those skilled in the art. Placing the polymeric sleeve 42 over most of the length of the flexible tube 41 facilitates the process of impregnating the flexible tube 41 with quick setting epoxy resin. In the present embodiment, it is preferred that the thermosetting resin be of the type that cures shortly after the flexible tubular member assembly 32 is positioned within the service pipe 18, as described in more detail hereinafter.

Referring now to FIGS. 12-14, to insert the flexible tubular conduit 48 within the flexible tubular member assembly 32, the bolts and nuts (not shown) are removed from the vertical cover plate 82 and flange 80 and the vertical cover plate 82 is then lifted from the flange 80, using the handles 88. A suitable length of hold back rope 75 is determined and one end 75a is attached to the center core 104 by means of a clamp (not shown) or the like. Control wheel 110 is rotated and the hold back rope 75 is spooled up or wrapped around the center core 104. The loose or other end 75b of the hold back rope 75 is attached or tied (not shown) to the trailing end 48b of the flexible tubular conduit 48. The control wheel 110 is rotated and the flexible tubular conduit 48 is spooled up on the control drum assembly 102 in an non-inverted state, as shown in FIG. 14.

With the flexible tubular conduit 48 completely wound around the center core 104, the leading end 48a of the flexible tubular conduit 48 is pushed out or through the exit port 114 and the annular member 116. The leading end 48a of the flexible tubular conduit 48 preferably extends beyond the annular member 116 approximately six inches and is cuffed or turned back, generally designated 49, over the annular member 116. The cuffed or turned back portion of the flexible tubular conduit 48 is secured to the annular member 116 by means of one or more banding clamps 178 or the like (see FIG. 12), as is apparent to those skilled in the art. The vertical cover plate 82 and gasket 84 are positioned on the flange 80 and the nuts and bolts (not shown) are used to secure the vertical cover plate 82 and gasket 84 to the flange 80 thereby sealing the chamber 74.

Referring now to FIGS. 12 and 13, to invert the flexible tubular conduit 48, all valves on the pressure vessel assembly 60 are closed and the flexible hose 126 attached to the compressed air source 62 is secured to the conduit 118 by the union 124. The compressed air source 62 is actuated and the air inlet valve 122 is opened to slowly actuate the air pressure regulator valve 120 to thereby introduce air pressure inside the chamber 74. As the air pressure within the chamber 74 increases, air pressure is applied to the cuffed portion 49 of the flexible tubular conduit 48 causing it to invert and extend away from the exit port 114, as governed by the control drum assembly 102 through the control wheel 110. Preferably, the flexible tubular conduit 48 inverts and extends away from the annular member 116 along the temporary mat 176 until it is positioned proximate the trailing end 32b of the flexible tubular member assembly 32.

To insert the flexible tubular conduit 48 into the flexible tubular member assembly 32, the air inlet valve 122 is closed and the air outlet valve 174 (see FIG. 14) is opened to allow air to escape from the chamber 74 thereby deflating the flexible tubular conduit 48. The trailing end 32b of the flexible tubular conduit assembly 32 is held open and the deflated cuffed portion 49 of the flexible tubular conduit 48 is hand inserted therein for approximately two feet. Air pressure is then reapplied to the chamber 74 as described above, and the cuffed portion 49 extends and moves through the flexible tubular member assembly 32 at a rate controlled by an operator turning the control wheel 110 until the cuffed portion 49 extends slightly beyond the leading end 32a of the flexible tubular member assembly 32 as shown in FIG. 4. The flexible tubular conduit 48 is then deflated as described above and the first service tube assembly 30 is ready to be positioned within the service pipe 18.

The method for assembling the second service tube assembly 50 is generally identical to that described above and, therefore, for convenience only, further description thereof is neither necessary nor required and is not limiting.

As mentioned previously, the flexible tubular member assembly 32, either with the first service tube assembly 30 or the second service tube assembly 50 is installed within the service pipe 18 with the flexible retainer 46 seated within the main pipe 14 proximate the service pipe terminal end 18b and the trailing end 32b positioned proximate the service pipe access end 18a. This is preferably accomplished by guiding and forcing the flexible tubular member leading end 32a through the service pipe access end 18a, the service pipe 18 and the service pipe terminal end 18b such that the flexible retainer 46 is positioned within the main pipe 14.

Referring now to FIGS. 3 and 5, the second service tube assembly 50 is inserted within the service pipe 18 using the push-in method in the following manner. The flexible sewer push rod 54 and pull back rope 40 are connected to the flexible tubular member assembly 32, as described above. The end of the second service tube assembly 50 proximate the leading end 32b of the flexible tubular member assembly 32 is inserted inside the clean-out fitting 24 or access end 18a by compressing or compacting the flexible retainer 46. The leading end 32a is pushed down through the service pipe 18 using the push pocket 52 and flexible sewer push rod 54 until the leading end 32a of the flexible tubular member assembly 32 and the flexible retainer 46 have appeared inside the main pipe 14 with the flexible retainer 46 in its expanded or relaxed condition, as shown in FIGS. 7 and 9.

To determine whether the leading end 32a and flexible retainer 46 have been properly positioned within the main pipe 14, a miniature television camera (not shown) is placed inside the main pipe 14 proximate the terminal end 18b. A worker viewing a corresponding television screen (not shown) radios instructions to the service crew proximate the clean-out fitting 24 when the leading end 32b and flexible retainer 46 appear in the main pipe 14, as shown in FIG. 9.

Figures 11, 11A:
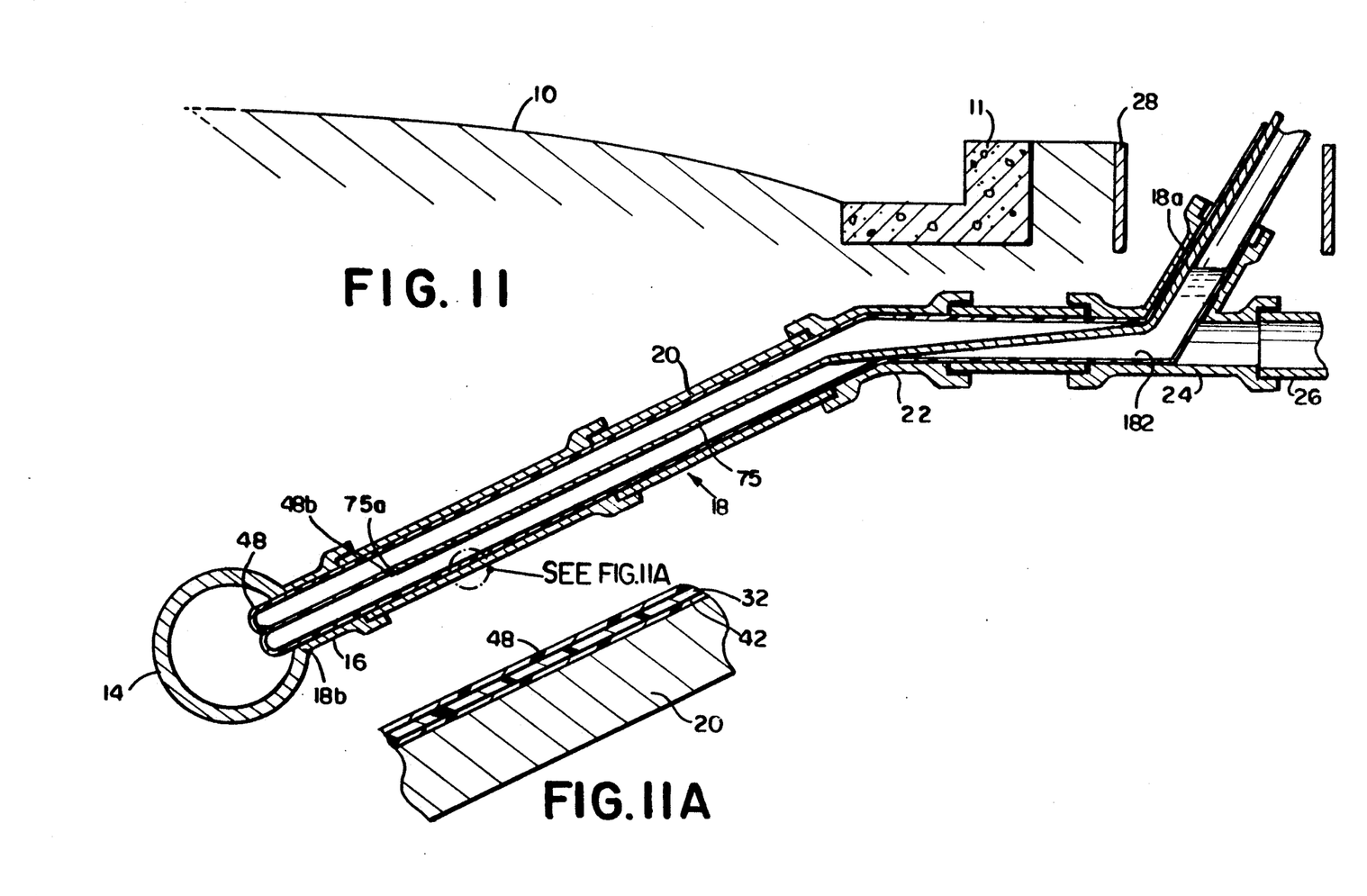
FIG. 11 is a greatly enlarged cross-sectional view of the street, main sewer pipe and service pipe showing the service tube assembly within the service pipe during the curing process in accordance with the present invention.
FIG. 11a is a fragmentary view of the service pipe and service tube assembly of FIG. 11.

To position the second service tube assembly 50 for the curing process, the flexible tubular member trailing end 32b is pulled toward the service pipe access end 18a using the pull back rope 40 such that the flexible retainer 46 seats within the main pipe 14 proximate the service pipe terminal end 18b. Consequently, the flexible tubular member assembly 32, including the flexible tube 41 and polymeric sleeve 42, is pulled taut within the service pipe 18, as shown in FIGS. 10 and 11.

While it is preferred that the flexible tubular member assembly 32 be installed within the service pipe 18 using the push pocket 52 and flexible sewer push rod 54 of the second service tube assembly 50, in the event that the service pipe 18 includes sharp bends or turns (e.g., see FIG. 15) it is preferred that the flexible tubular member assembly 32 be positioned within the service pipe 18 using the pull-in method associated with the first service tube assembly 30, described hereinafter.

Referring now to FIGS. 3 and 4, regarding the pull-in method of installing the first service tube assembly 30 within the service pipe 18, a small rope (not shown) is inserted into the clean-out fitting 24 and through the service pipe 18 using a pressure sewer cleaning jet hose assembly having a nozzle with a rope attachment feature (not shown), as is known to those skilled in the art. The pressure cleaning hose pushes the small rope to the nearest manhole (not shown) within the main pipe 14. The pull forward rope 38 is then attached to the trailing end of the small rope and is pulled through the manhole, the main pipe 14, the service pipe 18 and through the clean-out fitting 24 until the midpoint of the pull forward rope 38 is reached. The pull forward rope 38 is then inserted through the metal grommet 36 proximate the leading end 32a and is reattached to the small rope. Using the small rope the pull forward rope 48 is pulled back to nearest manhole in the main pipe 14 so that both ends of the pull forward rope 38 are at the manhole with the middle of the rope 38 extending through the grommet 36 on the leading end 32a of the flexible tubular member assembly 32.

The pull forward rope 38 is then pulled by a worker positioned proximate the manhole to guide and force the first service tube assembly 30 and flexible tubular member leading end 32a through the access end 18a, service pipe 18 and terminal end 18b into the main pipe 14. Once the leading end 32a of the flexible tubular member assembly 32 extends into the main sewer pipe 14, the flexible retainer 46 extends to its original incompressed shape. Using the pull back rope 40 as described above, the first service tube assembly 30 and flexible tubular member assembly 32 are pulled taut within the service pipe 18 to seat the flexible retainer 46 within and firmly against the main pipe 14 (see FIG. 10) as described above, with respect to the second service tube assembly 50.

Referring now to FIGS. 11 and 11a, after the television operator reports that the flexible retainer 46 is in its proper, seated position and that the flexible tubular member assembly 32 has been pulled taut within the service pipe 18, the flexible tubular conduit 48 is employed to force the flexible tubular member assembly 32 radially outwardly into engagement with the service pipe 18. More particularly, the flexible tubular member assembly 32 is forced radially outwardly by inflating the inverted flexible tubular conduit 48 with a fluid. In the present embodiment, it is preferred that the inverted flexible tubular conduit 48 be filled or inflated with air, as described above. That is, as shown in FIGS. 13 and 14, the air outlet valve 174 on the pressure vessel assembly 60 is closed and the air inlet valve 122 is opened and air pressure regulator 120 is operated to inflate the inverted flexible tubular conduit 48 while the control wheel 110 is rotatably fixed by a worker to prevent the cuffed portion 49 of the flexible tubular conduit 48 from extending further into the main pipe 14. The inflated flexible tubular conduit 48 forces the flexible tubular member assembly 32 radially outwardly to engage and conform to the interior surfaces of the service pipe 18 and to force some of the impregnated resin into any cracks or interstices within the walls of the service pipe 18.

As shown in FIG. 11, in the present embodiment, it is preferred that the thermosetting resin impregnated within the flexible tubular member assembly 32 be heat cured by filling the inverted flexible tubular conduit 48 with a heated fluid, preferably water 182. In the present embodiment, it is preferred that the fluid or water 182 have a temperature of approximately 150° F. However, it is understood by those skilled in the art, that other fluids or temperatures can be used to aid in the curing of the thermosetting resin, depending upon the environment in which the service pipe 18 is maintained and the type of resin used.

Referring now to FIGS. 13 and 14, the inverted flexible tubular conduit 48 is preferably filled with water 182 by connecting the flexible hose 154 to the conduit 151 via the union 152. The water inlet valve 150 and the water control valve 138 are opened and hot water 182 is pumped into the inverted flexible tubular conduit 48 from the hot water source 68 until an appropriate pressure is indicated on the pressure gauge 172. In order to provide space for the water 182, air is bled from the chamber 74 and replaced with water until snorkel control valve 142 can be opened and water flows out of the flexible hose 155. As is understood by those skilled in the art, the length or vertical height of the snorkel pipe 146 is calculated to provide sufficient water pressure within the inverted flexible tubular conduit 48 to thereby force the flexible tubular member assembly 32 radially outwardly.

After the inverted flexible tubular conduit 48 is filled with water 182 approximately up to the height of the clean-out fitting 24, the water inlet valve 150 is closed and preferably additional compressed air is added to the chamber 74 to cause the inverted flexible tubular conduit 48 to further expand radially outwardly and force the flexible tubular member assembly 32 against the inside of the service pipe 18. This condition is maintained for approximately one hour to allow the resin impregnated in the flexible tubular member assembly 32 to cure. The flexible tubular member assembly 32 and cured resin forms a relatively hard, tight fitting, rigid pipe lining which effectively seals any cracks and repairs any pipe or pipe joint deterioration to prevent leakage either into or out of the pipe. The cured resin flexible tubular member assembly 32 also serves to strengthen the existing pipe walls to provide added structural support for the surrounding overburden. Because the polymeric sleeve 42 does not extend the length of the felt tube 41, the flexible tubular member assembly 32 is directly bonded to the service pipe 18 only at the access end 18a and at the terminal end 18b.

Referring now to FIG. 14, once the flexible tubular member assembly 32 has cured, water outlet valve 160 is opened and the water 182 drains out of the flexible tubular conduit 48 through the flexible hose 164 as the flexible tubular conduit 48 is reeled within the chamber. Specifically, the control wheel 110 is rotated in the opposite direction and the hold back rope 75 is pulled upwardly and wound upon the center core 104 which in turn causes the flexible tubular conduit 48 to be reinverted and spooled up on the center core 104 of the control drum assembly 102 forcing the water 182 into the chamber 74. Since the pressure vessel assembly 60 is portable, it can then be moved to the next service location. A mini camera is used for final inspection of the flexible tubular member assembly 32 to ensure that there has been uniform penetration inside the main pipe 14 and the service pipe 18.

Figure 15:
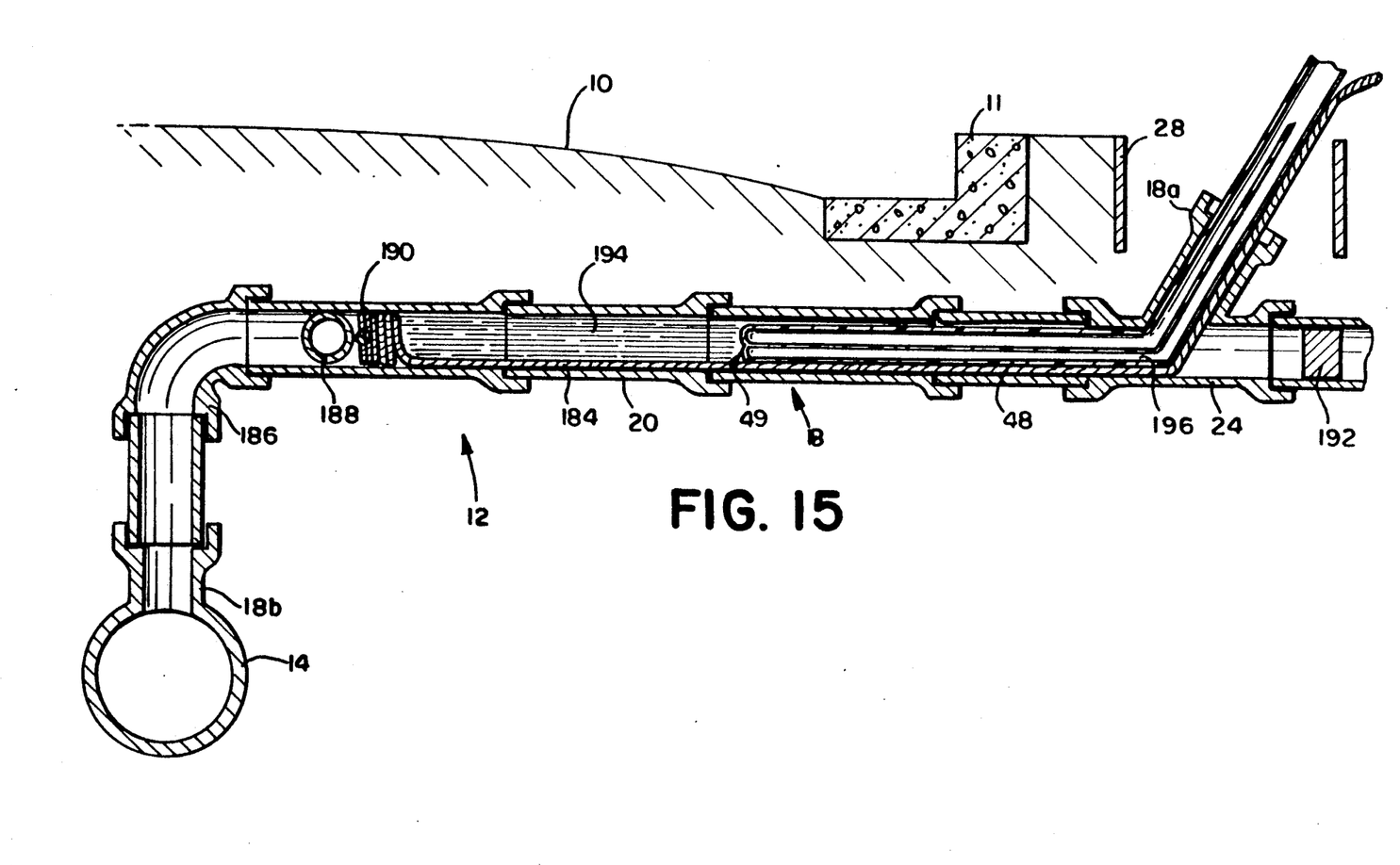
FIG. 15 is a cross-sectional view of a main sewer pipe and a service pipe having a ninety degree bend therein and apparatus for installing a cable within the service pipe in accordance with an alternate embodiment of the present invention.

Referring now to FIG. 15, there is shown an alternate method of installing a cable or small rope 184 within a service pipe 18 having an access end 18a and a terminal end 18b, wherein the service pipe 18 includes sharp bends or deflections which makes the insertion of a cable or small rope 184 as described above difficult and time consuming. The cable or small rope 184 is used to pull the larger pull forward rope 38 through the service pipe 18, as described above in connection with the first service tube assembly 30.

FIG. 15 shows a street 10 and sewer pipe construction 12 similar to that discussed above in connection with FIGS. 1, 2, and 3. However, FIG. 15 further includes a sharp or ninety degree bend section 186 which makes it difficult to install a small rope therethrough.

To install a small rope through the service pipe 18, a flexible leading member is provided, preferably in the form of an inflatable member or ball 188. The inflatable ball 188 is sized to complement the inner diameter of the service pipe 18 with a loose fit to allow the inflatable ball 188 to move freely therewithin, but at the same time provide a sufficient seal for building up pressure on the access end 18a side thereof. A pull ring 190 is attached to the outer surface of the inflatable ball 188.

The cable or small rope 184 is preferably attached to the inflatable ball 188 by tying one end of it through the pull ring 190. However, it is understood by those skilled in the art, that other methods can be used for securing one end of the cable or small rope 184 to the inflatable ball 188. For instance, the small rope 184 could be loosely taped to the inflatable ball 188. The other end of the small rope (not shown) is preferably tied or anchored to a fixed structure to prevent it from being pulled within the service pipe 18.

With the small rope 184 attached to the inflatable ball 188, the inflatable ball is positioned through the clean-out fitting 24 and is pushed inside the service pipe 18 using a flexible sewer push rod 54, as described above. As shown in FIG. 15, it is preferred that the inflatable ball 188 be positioned within the service pipe 18 between the access end 18a and the terminal end 18b proximate the ninety degree bend section 186.

A sewer plug 192 is positioned upstream of the clean-out fitting 24 for preventing sewage or other material from passing into the service pipe area between the clean out fitting 24 and the terminal end 18b, as is understood by those skilled in the art.

When the inflatable ball 188 is positioned near the ninety degree bend section 186, a predetermined slack length of cable or small rope 184 having one end connected to the inflatable ball 188 is positioned proximate the inflatable ball 188. In the present embodiment, it is preferred that the predetermined slack length of small rope 186 be at least equal to the distance between the terminal end 18b and the inflatable ball 188.

As shown in FIG. 15, the service pipe 18 is filled with pressurized fluid between the inflatable ball 188 and the access end 18a for moving the inflatable ball 188 through the service pipe 18 to the terminal end 18b to thereby move the inflatable ball 188 through the sharp bends of the service pipe 18. More particularly, at least a portion of the service pipe 18 between the inflatable ball 188 and the access end 18a is filled with an incompressible fluid 194, preferably water. The service pipe 18 is preferably filled with the incompressible fluid 194 to the extent that the slack length of rope 184 is covered therewith. Using the pressure vessel assembly 60, described above, the inverted flexible tubular conduit 48 is inserted through the access end 18a or clean-out fitting 24, as described in more detail above. That is, the flexible tubular conduit 48 is inverted and filled with a pressurized fluid 196, such as air, for moving the cuffed portion 49 of the flexible tubular conduit 48 through the service pipe 18 into engagement with the incompressible fluid 194 whereby the incompressible fluid 194 engages the inflatable ball 188 and moves it through the service pipe 18 toward the terminal end 18b as the inverted flexible tubular conduit 48 moves through the service pipe 18.

More particularly, as the flexible tubular conduit 48 advances within the service pipe 18 hydraulic pressure is applied through the incompressible fluid 194 to force the inflatable ball 188 through the ninety degree bend section 186 and into the main pipe 14. As the inflatable ball 188 moves forward the extra slack or predetermined length of small rope 184 moves with the inflatable ball 188 and follows the inflatable ball 188 through the ninety degree bend section 186 and into the main pipe 14. Since, the slack length of cable is positioned within the incompressible fluid 194, it is not caught between the flexible tubular conduit 48 and the service pipe 18, which would prevent the inflatable ball 188 from moving forward.

A television monitor, as described above, can be used to monitor the main pipe 14 to determine when the inflatable ball 188 and attached rope 184 enter the main pipe 14. The inverted flexible tubular conduit 48 is then wound out of the service pipe 18 using the control wheel 110 in the manner described above. Thereafter, pouring additional water into the main pipe 14 floats the inflatable ball 188 downstream to the nearest manhole (not shown). The flexible tubular member assembly 32 is pulled into the service pipe 18 using the small rope 184, as described in more detail above.

From the foregoing description, it can be seen that the present invention comprises an apparatus for installing a liner within a service pipe transversely connected to a main pipe and a method of installing the same. It is appreciated by those skilled in the art that changes could be made to the embodiments described above without departing from the broad inventive concepts thereof, it is understood, therefore, that this invention is not limited to the particular embodiments disclosed but it is intended to cover all modifications which are within the scope and spirit of the invention as defined by the appended claims.

We claim:

1. A combination liner and apparatus for installing the liner within a service pipe having a first inner diameter, an access end and a terminal end wherein the terminal end is transversely connected to a main pipe for allowing fluid to flow therebetween, the main pipe having a second inner diameter, the combination comprising:

a liner in the form of a flexible tubular member having a leading end and a trailing end, said leading end including a flexible retainer secured thereto for being positioned within said main pipe proximate said service pipe terminal end, said flexible retainer being generally annular and having an outer diameter which is greater than the first inner diameter of the service pipe for securing said leading end within said main pipe proximate said service pipe terminal end, a portion of said leading end of said flexible tubular member being rolled over said flexible retainer to secure said flexible retainer to said leading end of said flexible tubular member, said flexible tubular member being impregnated with a thermosetting resin which cures after said flexible tubular member is positioned within said service pipe;

installing means for positioning said flexible tubular member within said service pipe such that said flexible retainer is seated within said main pipe proximate said service pipe terminal end and said trailing end is positioned proximate said service pipe access end, said installing means includes a guide member releasably secured to the leading end of said flexible tubular member for guiding said flexible tubular member leading end through said service pipe access end and through said service pipe terminal end such that the flexible retainer is positioned within said main pipe; and curing means positioned within said flexible tubular member for forcing said flexible tubular member radially outwardly into engagement with said service pipe and for aiding the curing of said resin whereby said service pipe is lined with said flexible tubular member.

2. The combination as recited in claim 1, wherein said installing means further includes a pull member releasably secured to said trailing end of said flexible tubular member for pulling said trailing end toward said service pipe access end to thereby pull said flexible tubular member taut within said service pipe with said flexible retainer seated within said main pipe proximate said service pipe terminal end.

3. The combination as recited in claim 1, wherein said curing means includes a flexible conduit positioned within said flexible tubular member and means for filling said flexible conduit with a fluid for forcing said flexible tubular member outwardly into engagement with said service pipe and for curing said resin.

4. The combination as recited in claim 3, wherein the fluid is selected from a group consisting of water, air and both water and air.

5. A method of installing a liner within a service pipe having a first inner diameter, an access end and a terminal end wherein the terminal end is transversely connected to a main pipe having a flow therebetween, the main pipe having a second diameter, said method comprising the steps of:

providing a flexible tubular member having a leading end and a trailing end;

rolling a portion of said leading end of said flexible tubular member over a flexible retainer to secure said flexible retainer to said leading end of said flexible tubular member;

impregnating said flexible tubular member with a thermosetting resin which cures after said flexible tubular member is positioned within said service pipe;

guiding said flexible tubular member leading end through said service pipe access end and then through said service pipe terminal end such that said flexible retainer is positioned within said main pipe;

pulling said flexible tubular member trailing end toward said service pipe access end, such that the flexible retainer seats within said main pipe proximate said service pipe terminal end and said flexible tubular member is taut within said service pipe;

forcing said flexible tubular member radially outwardly into engagement with said service pipe; and curing said thermosetting resin whereby said service pipe is lined with said flexible tubular member.

6. The method as recited in claim 5, wherein the step of forcing the flexible tubular member radially outwardly into engagement with said service pipe comprises the steps of:

positioning a flexible tubular conduit within said flexible tubular member; and filling said flexible tubular conduit with a fluid for forcing said flexible fabric tubular member outwardly.

7. The method as recited in claim 6, wherein the step of curing said resin comprises the steps of:

filling said flexible tubular conduit with a heated fluid for aiding in the curing of said resin.

* * * * *